Aug. 22, 1944. J. W. KOLBERT ET AL 2,356,592
APPARATUS FOR PRODUCING ULTRA-VIOLET RADIATION
Filed Jan. 22, 1943 2 Sheets-Sheet 2

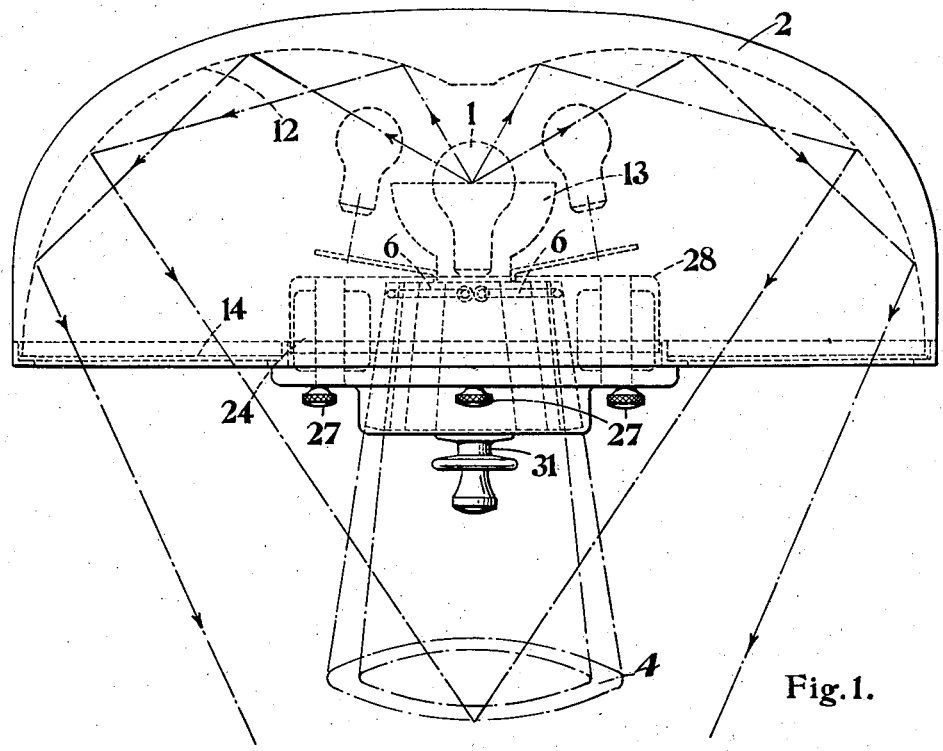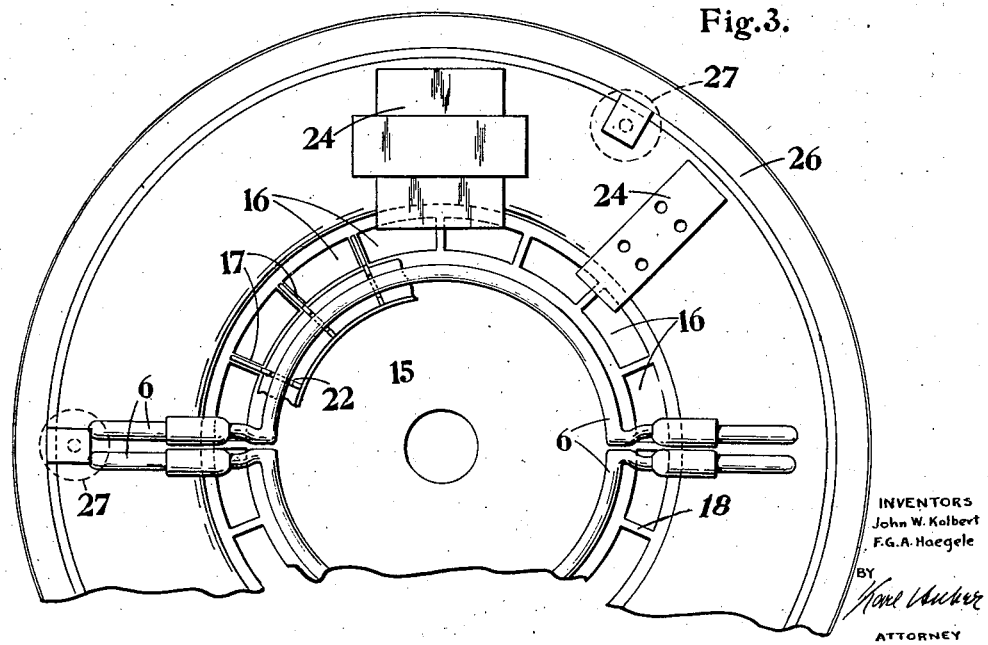

INVENTORS
John W. Kolbert
F.G.A. Haegele
BY
ATTORNEY

Patented Aug. 22, 1944

2,356,592

UNITED STATES PATENT OFFICE 2,356,592

APPARATUS FOR PRODUCING ULTRA-VIOLET RADIATION

John Walter Kolbert and Frederick Gustav Adolf Haegele, Cippenham, Slough, England, assignors to The Hanovia Chemical and Manufacturing Company, Newark, N. J., an American company Application January 22, 1943, Serial No. 473,180
In Great Britain May 9, 1942

7 Claims. (Cl. 250—88)

The present invention relates to improved apparatus for producing ultra-violet radiation.

Modern surgical operating rooms are frequently equipped with a source of light designed to throw a so-called shadowless light on to that part of the patient upon which the operation is being conducted.

During an operation opportunity arises for germs to enter the body by a route which is normally closed to them, namely the operation wound; despite rigid aseptic technique germs do in fact travel by this path. The germs may come from the operators, despite their masks, or from the floor by the movement of the operators or from air borne from a distance. Conversely germs which are dangerous to the operating personnel can arise from certain types of wounds.

It has already been proposed to eliminate or diminish this danger by irradiating the wound or the air round the wound, with ultra-violet radiation, and an improvement in the subsequent condition of the patient has been observed, for example there may be a shortening of the post-operation treatment and a shortened convalescence.

Hitherto, however, certain disadvantages have invariably attended the particular methods of irradiating already suggested.

According to the present invention a source of ultra-violet radiation is associated with an optical or equivalent projecting system adapted to project a beam that is wholly or in part hollow or annular so as to fall upon the patient around the wound but avoiding the wound.

The apparatus for producing ultra-violet radiation may be used with the known optical system adapted to project a shadowless beam of light on to the patient. The shadowless illuminating or optical system may comprise a source of light disposed at the centre of a hood-like or annular reflector which directs a beam subtending a large angle at the operating area, thus producing a shadowless patch of light over this area due to the multi-directional incidence of light at any point in the working plane. The source of ultra-violet radiation may be disposed in the system at such a position that a hollow cylindrical or conical beam of ultra-violet radiation, which may be of any suitable cross-section, is projected on to the patient, striking the body around the wound. By this means a barrier of bactericidal radiation is disposed between the operator and his assistant and the open wound and at the same time no radiation is directed on to the wound area.

According to the invention, also, a hollow beam of ultra-violet radiation adapted to irradiate an annular or ring-like area upon a surface such as an operating table may be produced by associating a source of ultra-violet radiation with a baffle or baffles disposed intermediate the said source and the surface to be irradiated and presenting an opening or openings determining the cross-sectional form to be given to the beam.

According to the invention, moreover, the source of ultra-violet radiation may in form follow a closed or annular figure and may be positioned to the outer side of the upper end of a screening surface of frusto-conical or other closed formation disposed immediately above the baffle or baffles, the base of the said screening surface being on the inner side of the opening or openings of the baffle or baffles.

According to the invention, moreover, the screening surface may support radial baffle surfaces determining passage-ways along which the beam of radiation may pass to the opening or openings of the baffle or baffles.

The source of ultra-violet radiation may be a low pressure mercury vapour discharge tube or tubes shaped to a closed figure of circular or non-circular form according to the shape to be given to the irradiated area of the operating table or surface. A single screening surface or an assembly of such surfaces may be provided that advantageously tapers in form and in cross-section follows the form of the source of ultra-violet radiation, while a slotted baffle or spaced baffles may be provided.

The invention further comprises the features of construction hereinafter described.

The invention is illustrated by way of example in the accompanying drawings.

Figure 1 is a view in elevation of an operating room lamp of a modified construction fitted with an apparatus for producing ultra-violet radiation in accordance with the invention.

Figure 3 is a plan view in accordance with Figure 2, the components of the illuminating lamp being omitted.

While the apparatus for producing ultra-violet radiation may be constructed as a self-contained and independently operating unit, it has special application in association with operating theatre and like lamps that are adapted to give shadowless illumination of the operating table or of the body of the patient.

Figure 2:
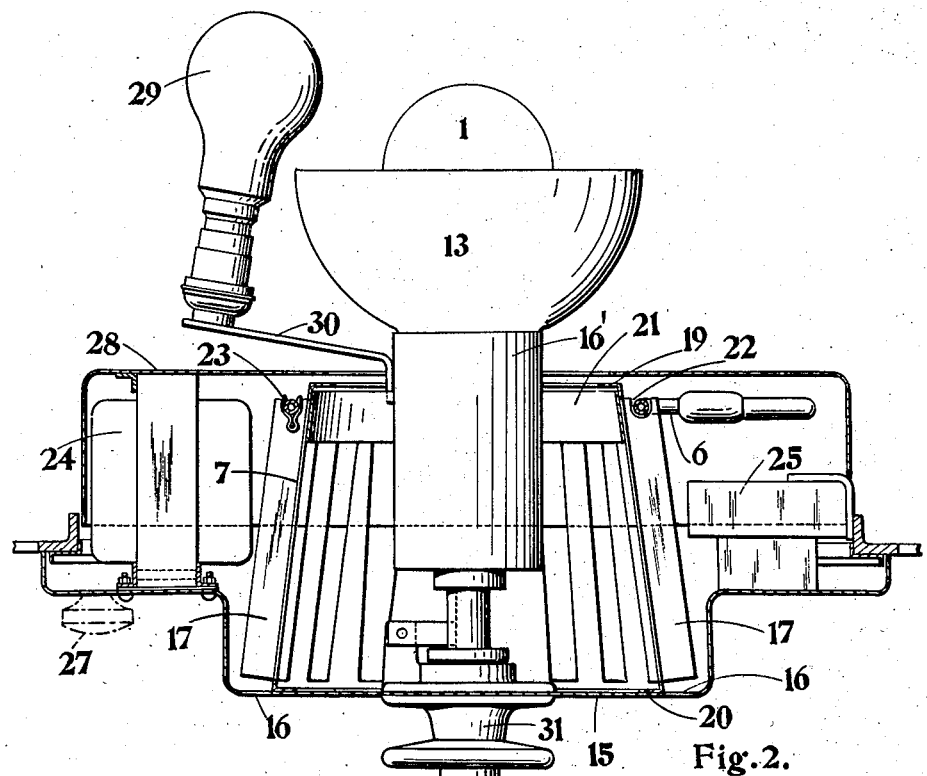
Figure 2 is an elevation partly in section of the part of the combined lamp and apparatus for producing ultra-violet radiation illustrated in Figure 1, but to an enlarged scale.

In Figures 1 to 3 of the accompanying drawings the invention is illustrated in the application of the apparatus to an operating theatre lamp that is provided with a hood 2 of an inverted basin-like shape that houses an illuminating lamp bulb 1 set axially in the hood 2 so that the light rays of greatest intensity are directed upwardly to fall upon the curved reflector 12 lining the hood 2 and adapted to reflect the rays of light as a hollow conical or convergent beam that forms a shadowless patch of light at the level of the operating table. The downwardly directed rays of light from the lamp 1 are received by the semi-spherical reflector 13, serving to reflect such rays to the reflector 12. The lower part of the hood 2 is closed by glass panels 14 that are translucent and that serve for the diffusion of the light rays reflected by the reflector 12.

The apparatus for producing ultra-violet radiation comprises two low pressure mercury discharge tubes 6, each shaped to a semi-circular curvature and that are mounted around the upper end of a frusto-conical screen 7 supported at the lower end upon a sheet metal base plate 15 by which the support 16' for the lamp bulb 1 and reflector 13 is carried.

The base plate 15 is provided with slots 16 spaced at close intervals in circular formation just outside the base of the screen 7. The said screen 7 is punched or stamped in order to permit the formation therefrom of baffle-plates 17 disposed in vertical planes and positioned immediately above the strips 18 separating the slots 16, thus forming a series of channels between the discharge tubes 6 and the slots 16 through which the ultra-violet radiation may be directed downwardly at an angle determined by the inclination of the frusto-conical screen 7, extending through the slots 16 as a hollow diverging beam to the patient directly beneath the illumination lamp. The baffle plates 17 prevent the scattering of radiation at various angles and consequent diffusion and ensure that the radiation is directed downwards to form a clearly defined annulus or ring of irradiation 4 upon a plane surface that is interposed at right angles to the path of the beam within its effective range, said annulus being dimensioned by the relative positions of the discharge tubes 6 and the slots 16, the angle of slope of the screen 7 and the distance of the slots 16 from said surface. Any substantial amount of radiation allowed to scatter at any appreciable angle to the vertical would fall inside or outside the desired annulus or ring and defeat the object of the invention.

The dimensioning of the annulus or ring of irradiation is limited by the necessity to prevent any substantial amount of radiation falling upon the operation wound and also by the illumination requirements of the operating personnel. In a practical form of the apparatus for example, the discharge tubes, of semi-circular form, have a radius of 3¼ inches while the slots 16 are disposed around a circle of a diameter of 7¼ inches thus producing an annulus or ring of irradiation having an internal diameter of 9½ inches when the slots are at a distance of 24 inches from the operating table. As the illuminating lamp is removed away from the operating table, the annulus or ring of irradiation increases in diameter so that when the slots are 30 inches from the operating table the internal diameter of the annulus or ring of irradiation is approximately 10 inches and at 36 inches distance the internal diameter is approximately 11 inches.

The frusto-conical screen 7 is advantageously provided at the ends with flanges 19 and 20 directed inwardly, the flange 20 serving to permit the screen to be secured to the base plate 15 by rivets, screws or bolts while the flange 19 assists to maintain the screen against distortion. The upper part of the screen may further be strengthened by a sheet metal bush 21. The screen 7 is adapted to carry the discharge tubes 6 in any suitable manner; thus, the upper edges of the baffles 17 may be recessed at 22 for the reception of the discharge tubes which lie within the recesses and may be retained against dislodgment by spring clips such as 23.

The irradiation apparatus, together with the necessary transformers 24 and the electrical controls and the contact block 25, is so placed concentrically upon and carried by the base plate 15 of the illuminating lamp that it does not interfere with the balance of the said lamp or the reflecting system thereof. The base plate is secured to a circular frame member 26 of the illuminating lamp by means of holding screws 27 and the irradiation apparatus is entirely enclosed by a screen 28 in order to prevent any visible light rays passing through the slots 16 and thus defeating the object of the illumination reflecting system, that is to say, the provision of indirect reflected light and the avoidance of shadows on the operating table. The screen 28 is of such form that on the removal of the holding screws 27 the base plate together with the irradiation apparatus, the holder 16 for the lamp bulb 1, the reflector 13 and the emergency lamp bulbs 29 and their brackets 30 may be withdrawn from the hood 2.

Figure 5:
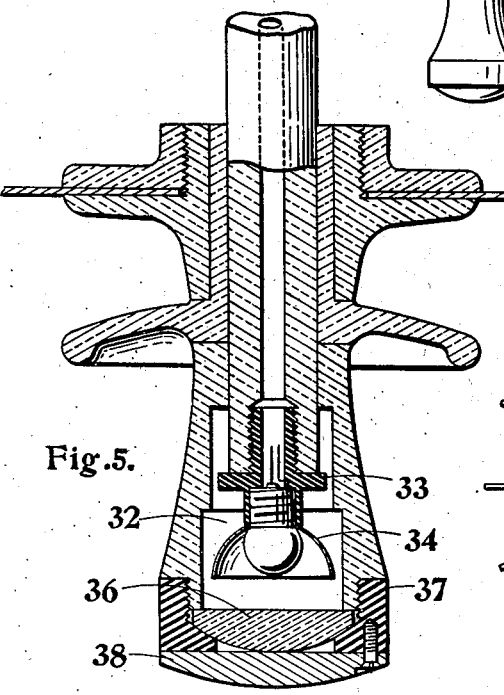
Figure 5 is a sectional view, on an enlarged scale, of a spot-light device fitted on the handle of the lamp and serving for centering the illumination and the ultra-violet radiation.

It is an essential feature of the invention that the annular beam of ultra-violet radiation should form a barrier around the operation wound so as to destroy bacteria which might otherwise reach the wound from the operating personnel, or otherwise. It is also essential that the operation wound should not be irradiated, that is to say, that the wound should be approximately at the centre of the annulus or ring of irradiation. As the radiation is practically invisible to the eye in daylight or artificial light, it is desirable to provide some means of ascertaining the position of the centre of the annulus or ring where it falls upon the operating table. This object may be achieved, for example, by the provision of a small spotlight mounted centrally on the underside of the illuminating lamp and surrounded by a suitable reflector so as to throw a narrow or parallel beam of light vertically downward. This spotlight is advantageously fitted with an independent electrical circuit and switch, for example of pressbutton type, so that it need only be used to indicate the centre of the patch of light and therefore the centre of the annulus or ring of irradiation since the irradiation apparatus is mounted concentrically. If the illuminating lamp be moved during the operation, the spotlight can be switched on momentarily so that the irradiation apparatus may be centralised once again. In the illuminating lamp illustrated in Figures 1 to 3 a central handle 31 is provided which projects vertically downward from the underside of the lamp. The handle may be recessed axially, as illustrated in Figure 5, of the accompanying drawings, at 32 for the reception of a lamp holder 33, reflector 34, and lamp bulb 35, enclosed by a lens 36 held by a retaining ring 37. The lens may be obscured by a closing plate 38 forming the end of the handle and pivotally mounted upon the ring 37 to permit it to be thrust laterally for the exposure of the lens 36.

In some forms of illuminating lamp an open reflector is used and a variation is then possible in the disposition of the irradiation apparatus since no glass screen is present to interfere with the ultraviolet radiation. In such lamps, the irradiation apparatus may be mounted on the top of the illuminating lamp and the slots for the passage of the beam of ultra-violet radiation may be formed in the outer casing of the lamp. The dimensions of the discharge tubes, the positioning of the slots, and the angle of slope of the frusto-conical screen, will then depend upon the constructional details of the illuminating lamp and can be varied to achieve the object of providing an annulus or ring of irradiation upon the operating table as before.

In any type of illuminating lamp provided with a reflecting system which deflects the rays of light from the source of light laterally whence they are reflected downwardly as a convergent beam, there is no direct downward illumination and the convergent beam of illumination presents a "dead" space formed directly under the centre of the lamp in the form of an inverted cone of darkness. This "dead" space can be utilised for the mounting of the irradiation apparatus upon the underside of the illuminating lamp so that it does not impede the passage of the convergent beam of light from the reflecting system.

Figure 4:
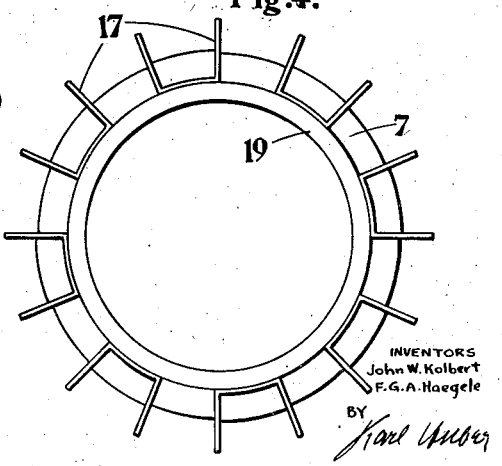
Figure 4 is a plan view of a modified construction of the conical baffle-screen of the apparatus for producing ultra-violet radiation illustrated in Figures 1 to 3.

It will be understood that the invention is not limited to the constructional details hereinbefore described. Thus, the hollow beam of radiation may be of any cross-sectional form that may be dictated by the requirements of particular applications of the irradiation apparatus. Thus it may in certain instances be desirable that the beam should be of an elongated cross-section or in other cases that it should take a particular configuration. Further, where the apparatus is provided to operate as an independent unit the construction of the enclosing casing may be modified accordingly. Again, for example, the construction of the frusto-conical screen 7 of the construction represented in Figures 1 to 3 may be modified. Thus in Figure 4 of the accompanying drawings there is illustrated a modified construction in which the conical screen 7 is solid and the baffles 17 are mounted thereon in the form of spaced channel fittings each providing a pair of the baffles. The screens of the construction having concentric screens may be provided with baffles in the form of flanges directed inwardly with respect to the intervening space for the purpose of reducing the possibility of reflection of the radiation. Such flanges may be provided along a part or the whole of the depth of the screens.

We claim:

1. An apparatus for producing ultra-violet radiation including a source of ultra-violet radiation, an optical projecting system associated with said source and including means to project substantially all of the ultra-violet radiation in the form of a hollow beam that will irradiate an annular area enclosing an area substantilly free from irradiation, whenever a plane surface is interposed at right angles to the path of the beam within its effective range.

2. An apparatus for producing ultra-violet radiation according to claim 1, wherein said means comprises a frusto-conical screen and a baffle perforated with a series of openings surrounding the base of the screen, and said source of ultra-violet radiation is disposed around the upper end of the screen.

3. An apparatus for producing ultra-violet radiation according to claim 1, wherein said means comprises a frusto-conical screen, and with the addition of a series of radiating baffles supported by said screen and subdividing the path of the beam of radiation in the direction of its projection.

4. An apparatus for producing ultra-violet radiation according to claim 1, wherein said means comprises a frusto-conical screen, and with the addition of a series of radiating baffles supported by said screen and subdividing the path of the beam of radiation in the direction of its projection, said baffles being integral with and formed from the screen.

5. An apparatus for producing ultra-violet radiation according to claim 1, wherein said means comprises a frusto-conical screen, and with the addition of a series of radiating baffles supported by said screen and subdividing the path of the beam of radiation in the direction of its projection, said baffles constituting channel-like fittings applied to the screen.

6. An apparatus for producing ultra-violet radiation according to claim 1, with the addition of means for centralizing the beam of ultra-violet radiation upon the surface irradiated.

7. An apparatus for producing ultra-violet radiation according to claim 1, with the addition of an illuminating lamp such as an operating room lamp for producing upon said plane surface a shadowless patch of light.

JOHN WALTER KOLBERT.
FREDERICK GUSTAV ADOLF HAEGELE.